United States Patent Office 2,801,992
Patented Aug. 6, 1957

2,801,992

SUSPENSION STABILIZER OF MAGNESIUM HYDROXIDE AND EXCESS ALKALI

Henry Malcolm Hutchinson, Banstead, and Kenneth Stevens, Wallington, England, assignors to The Distillers Company Limited, Edinburgh, Scotland, a British company No Drawing. Application August 4, 1954,
Serial No. 447,921

Claims priority, application Great Britain August 19, 1953

7 Claims. (Cl. 260—93.5)

The present invention relates to the polymerization of polymerizable ethylenic monomers, particularly vinyl aromatic compounds such as styrene, by the suspension or "pearl" polymerization procedure.

It is known that if the polymerization of styrene is effected with the monomer dispersed by agitation throughout an aqueous phase in the form of discrete globules, the resultant polymer is produced in the form of discrete particles or "pearls." In carrying out such a suspension polymerization procedure it is essential to maintain the dispersion in a stable state both initially and while the polymerization is taking place, i. e. the globules must not coagulate to form monomer particles of too large a size to give suitably sized polymer pearls, nor must the globules break up so as to form a stable emulsion from which the resultant polymer has to be recovered by coagulation. It is, therefore, customary to carry out the suspension polymerization procedure in vessels suitably equipped with stirrers and the like which keep the monomer dispersed in the aqueous phase.

In practice, it has also been found necessary to add suspension stabilizers to the agitated dispersion in order to maintain the polymerizing monomer suitably dispersed throughout the aqueous phase. It has already been suggested that finely divided inorganic compounds such as kaolin, talc, barium sulphate, kieselguhr, aluminium oxide may be used as suspension stabilizers. With the above inorganic stabilizers it is often necessary to use relatively high proportions i. e. about 5% by weight in grams based on the volume in milliliters of the monomer in order to form a stable dispersion and consequently a comparatively large amount of the inorganic material may become trapped during the polymerization process in the polymer particles formed, thus affecting the physical properties of the final polymer.

The object of the present invention is to provide a suspension stabilizer for use in the suspension polymerization of ethylenic monomers which is effective in relatively low proportions based on the monomer present in the system. A further object is to provide a suspension stabilizer which is easily removable from the produced polymer particles.

According to the present invention the process for the suspension polymerization of a polymerizable ethylenic monomer comprises polymerizing the monomer in an aqueous suspension containing excess alkali in the presence of finely divided magnesium hydroxide as suspension stabilizer.

Any polymerizable ethylenic monomer may be used in the process of the persent invention. By the expression polymerizable ethylenic monomer is meant throughout the specification any ethylenic compound, i. e. a compound containing the group >C=C<, which is polymerizable under the conditions of suspension polymerization. The suspension polymerization mixture may contain a polymerization catalyst such as an organic peroxide, and may be heated and may be at subatmospheric, atmospheric or superatmospheric pressure. Mixtures of two or more polymerizable monomers may be copolymerized according to the process of the present invention and also mixtures of a polymerizable ethylenic monomer with other ethylenic compounds which will not polymerize by themselves but will copolymerize with the polymerizable ethylenic monomer, may be used. Suitable polymerizable ethylenic monomers are methyl methacrylate, ethyl acrylate, butadiene and acrylonitrile.

The process of the present invention is particularly useful when applied to the suspension polymerization of vinyl aromatic compounds. Examples of vinyl aromatic compounds are styrene, its polymerizable homologues obtained by substituting one or more of its nuclear hydrogen atoms with halogen atoms or with saturated or unsaturated aliphatic groups such as the ortho- and para-monochlorostyrenes, the dichlorostyrenes, the methyl, ethyl, propyl and butyl styrenes and the divinyl benzenes.

The polymerization of the polymerizable ethylenic monomer may be brought about using any polymerization conditions which have heretofore been employed in suspension polymerization procedures. The polymerization is preferably brought about by heating the monomer suspension in the temperature range 60° C. to 160° C. Temperatures outside this range may be employed although the rate of polymerization is rather slow below 60° C. in the case of styrene for example. When temperatures near and above 100° C. are used to bring about the polymerization reaction, it is necessary to employ superatmospheric pressures in order to keep the aqueous suspension in the liquid phase. For instance, the boiling point of the styrene-water azeotrope is 92° C. at atmospheric pressure and consequently superatmospheric pressures have to be employed for the polymerization of styrene by the process of the present invention at temperatures above this value.

In the case of styrene polymerization, the product is often required to have properties which make it suitable for injection moulding, extrusion and other processes involving the manipulation of the polymer in a viscous liquid condition. This requires that the melt viscosity and flow properties of the polymer shall be suitable, which in turn means that the average molecular weight of the polymer must not be too high. Polymerization of styrene at temperatures below 100° C. will give products of molecular weight too high for easy moulding, and it is preferable to carry out the polymerization at temperatures of the order of 150° C. when the polymer has a lower molecular weight and satisfactory moulding and flow characteristics. Very few of the known suspension stabilizers will give stable suspensions at such polymerization temperatures. The present invention provides stabilizers which are perfectly satisfactory at 150° C. or above.

The rate of polymerization may be increased by the addition to the ethylenic monomer of a polymerization catalyst which is soluble therein. Such catalysts are well known in the art and as examples may be mentioned the organic peroxides such as benzoyl peroxide.

The aqueous suspension containing the finely divided magnesium hydroxide must contain excess alkali, that is an excess of free hydroxyl ions. It has been discovered, most surprisingly, that magnesium hydroxide in the absence of excess alkali does not act as an efficient stabilizer for aqueous suspensions of polymerizable ethylenic monomers generally and, in particular, for vinyl aromatic compounds such as styrene, when employed in the relatively low concentrations contemplated by the present invention. However, if excess alkali is added the stabilizing power of the magnesium hydroxide is increased many times and stable suspensions can be obtained using low concentrations of magesium hydroxide; in the absence of the excess alkali these systems are unstable and the suspensions break down.

Any soluble alkali which does not prevent the polymerization of the polymerizable ethylenic monomer may be added to the aqueous suspension; most suitably sodium hydroxide is employed. The amount of excess alkali present in the aqueous suspension of the present invention does not appear to be critical with regard to the stability of the suspension. It is preferred that the excess should not be too great since the suspension is preferably neutralized or acidified before the polymer is recovered from the reaction mixture. Moreover, a great excess of free hydroxyl ions has a deleterious effect on the power and stability of certain peroxide polymerization catalysts. Generally a molar excess of alkali lying in the range from 1% to 10% on the moles of magnesium hydroxide stabilizer present in the reaction mixture is most suitable.

The finely divided magnesium hydroxide may be added to the water of the aqueous suspension either before or after the addition of the polymerizable ethylenic monomer thereto. Preferably the finely divided magnesium hydroxide is formed from an aqueous solution of a magnesium salt and the resultant aqueous magnesium hydroxide suspension used as the aqueous phase in the dispersion polymerization.

The finely divided magnesium hydroxide may be prepared by any suitable means. Preferably the finely divided magnesium hydroxide is prepared by adding a strong base, for instance, sodium, potassium or calcium hydroxides, to a solution of a soluble magnesium salt, such as, for instance, magnesium chloride or magnesium sulphate. The use of the alkali metal hydroxides is preferred. The magnesium salt solution from which the magnesium hydroxide is prepared may be at any temperature from 0 to 100° C. and may be at any concentration. However, the most efficient stabilizers are prepared by precipitating the magnesium hydroxide from cold rather than hot solutions. If the precipitation is carried out in concentrated solutions which are subsequently diluted to form the aqueous phase of the polymerization suspension, the average particle size of the resulting polymer is somewhat reduced.

The quantity of magnesium hydroxide suspension stabilizer present in the aqueous suspension may vary considerably, but it is expedient to employ as low a concentration thereof as possible so as to reduce to a minimum the amount of stabilizer which might tend to become occluded in the formed polymer particles. The advantage of the process of the present invention is that concentrations of suspension stabilizer well below 5% by weight in grams on the volume in milliliters of the polymerizable ethylenic monomers present are sufficient to stabilize the suspension and, in fact, the preferred concentration is in the range 0.1 to 1% by weight in grams on the volume in milliliters of the monomers initially present. Under suitable conditions of stirring and temperature and, with a suitable phase ratio of monomer to water, it is often possible to produce stable dispersions using amounts of stabilizer below the above range.

The ratio of monomer to water can be varied considerably, but it is preferred to operate with the monomer:water ratio as high as possible so that the volume of the polymerization reaction mixture is kept as low as possible and therefore maximum quantities of polymer can be produced from a polymerization vessel of given volume. It will be appreciated that as the proportion of monomer to water is increased the stability of the resultant suspension is reduced, but using the suspension stabilizer system of the present invention stable suspensions may be obtained with monomer:water ratios below 1:1. It is generally most suitable to operate with a monomer:water ratio in the range 1:1 to 1:10 and particularly suitable systems are obtained in the range 1:1 to 1:2 when styrene is polymerized.

A particular advantage of the magnesium hydroxide suspension stabilizer of the present invention is that it can readily be removed from the polymer suspension when the polymerization is completed. Not only can it be removed by the conventional tumbling and water-washing techniques, but also, if the washing water is made acid, any residual magnesium hydroxide particles remaining on the polymer beads are dissolved and are therefore completely removed.

The particle size and quality of the polymer produced by the suspension polymerization technique will depend on the various variable factors of the procedure, such as, for instance, the degree of agitation of the dispersion, the monomer:water ratio, the temperature of the polymerization, and concentration of the polymerization catalyst employed and the quantity and size of the inorganic suspension stabilizer particles. It has now been discovered that the particle size and quality of the polymer produced according to the process of the present invention and in particular the stability of the monomer suspension may be controlled by the addition to the aqueous dispersion of small quantities of surface-active or emulsifying agents. By surface-active or emulsifying agents we means those organic compounds which, when dissolved in water, have the property of altering its surface tension. Such compounds possess an organophilic group associated with a hydrophilic group and particularly useful surface-active agents are the organic sulphates and sulphonates obtained by the sulphation or sulphonation of alcohols and hydrocarbons; alkali sulphite-addition products of neutral esters of unsaturated polycarboxylic acids; alkyl aromatic sulphonates and aryl alkyl poly-ether sulphates such as are obtained by the sulphonation of the condensation products of ethylene oxide and alkyl phenols.

The presence of small quantities of a surface-active or emulsifying agent in the dispersion being polymerized according to the process of the present invention may alter the size of the produced polymer particles and tends to increase the stability of the dispersion, especially when high temperatures are used.

Very small quantities of surface-active or emulsifying agents produce the abovementioned effects and it is essential that the amount of such agent added should not be increased to such an extent that the emulsification of the water and the monomer takes place, with the formation of a true emulsion as distinct from a dispersion in which the dispersed particles are kept suspended by agitation. Generally, the amount of agent added should not be more than 10% based on the weight of suspension stabilizer used and amounts considerably below this quantity may give useful improvements to the dispersion polymerization process of the present invention.

The following examples illustrate the use of magnesium hydroxide as a suspension stabilizer according to the process of the present invention.

*Example 1*

614 grams of magnesium chloride ($MgCl_2.6H_2O$) or an equivalent quantity of magnesium sulphate (745 gms. of $MgSO_4.7H_2O$) are dissolved in 25 liters of water in a stainless steel pressure vessel, and 253 grams of sodium hydroxide, dissolved in 2.27 liters of water, are added, with stirring. 27.25 liters of styrene monomer are then added, and the charge is flushed out with nitrogen and polymerized at 150° C., with a continuous stirring for 12 hours. Residual monomer is removed by steam distillation, and the charge is acidified with sulphuric acid to dissolve the magnesium hydroxide. The polymer is obtained in the form of small spherical beads.

If the above procedure is repeated using the stoichiometrical amount of sodium hydroxide to react with the magnesium salt and the same reaction conditions as employed above are used, it is found that the dispersion collapses after ¾ hour at 150° C. with the formation of large lumps of partially polymerized styrene and the process becomes unworkable.

*Example 2*

The first process of Example 1 using excess alkali is repeated but 1 ml. (milliliter) of commercial "Teepol" solution is added to the suspension. Commercial "Teepol" solution consists essentially of a 20% by weight aqueous solution of sodium secondary octadecyl sulphate. A very stable suspension is obtained which shows no signs of forming an emulsion. The polymer is obtained as small spherical beads very similar to those obtained in Example 1.

Essentially similar results are obtained by replacing the "Teepol" solution employed above with an equivalent amount of any other sulphate or sulphonate surface-active agent.

*Example 3*

An 0.49% weight/volume aqueous suspension of magnesium hydroxide containing excess sodium hydroxide is prepared from a solution of magnesium sulphate in water by adding thereto a 5% stoichiometrical excess of sodium hydroxide in aqueous solution. To this suspension is added an equal volume of styrene and the mixture is stirred and polymerized in the absence of oxygen at 150° C. for 12 hours in a stainless steel pressure vessel. Residual monomer is removed by steam distillation and the charge is acidified with sulphuric acid to dissolve excess magnesium hydroxide. The polymer is obtained as large spherical beads.

The above procedure is repeated using the same ingredients as above with the addition of 1 ml. of commercial "Teepol" solution. A stable dispersion is formed and the polymer is recovered as spherical beads whose average size is somewhat smaller than that of the beads obtained in the absence of the "Teepol." The size of the polymer beads produced in these two procedures is shown in the following table giving the sieve analyses (percent w./w. retained) of the two samples of polymer:

| Aperture(ins.) | 0.186 | 0.164 | 0.101 | 0.062 | 0.029 | 0.017 | 0.010 | 0.007 | 0.006 | <.016 |
|---|---|---|---|---|---|---|---|---|---|---|
| Without Teepol | 0.6 | 3.2 | 20.6 | 6.7 | 1.3 | 6.8 | 44.9 | 9.3 | 2.8 | 3.8 |
| With Teepol | | | | 3.0 | 11.4 | 4.7 | 43.5 | 18.2 | 9.1 | 10.1 |

If the process of Example 3 is repeated again adding the 1 ml. of the "Teepol" solution but using only the stoichiometrical amount of sodium hydroxide solution, it is found that the resultant dispersion is unstable and the polymerization in pearl form cannot be carried out owing to the separation of the charge into two layers.

*Example 4*

300 ml. of an aqueous suspension containing .065% by weight of magnesium hydroxide and also containing excess caustic soda is prepared by adding to an aqueous solution of magnesium sulphate at 80° C., a quantity of 1% by weight caustic soda solution which contains a 5% excess of sodium hydroxide over the stoichiometrical amount required to react with the magnesium sulphate. To this suspension is added 150 ml. of monomeric styrene containing 0.4% by weight of benzoyl peroxide and the whole mixture is stirred into a stable suspension and polymerized in the absence of oxygen at 80° C. for 15 hours. The polystyrene is obtained in good yield in the form of small, clear, spherical beads.

The above procedure is repeated, but the excess sodium hydroxide is replaced with a 5% molar excess of magnesium sulphate. In this case it is not possible to form a stable suspension which can be polymerized satisfactorily since it is found that any suspensions which are initially formed break down shortly after polymerization commences.

*Example 5*

2 volumes of an aqueous magnesium hydroxide suspension (containing 0.1% w./v. of magnesium calculated as the oxide) is prepared by precipitation from magnesium sulphate solution by adding a 5% stoichiometrical excess of sodium hydroxide solution. 1 volume parachlorostyrene monomer, containing 0.2% w./v. benzoyl peroxide is dispersed in the above suspension and the stirred charge is polymerized for 10½ hours at 80° C. The product is steam-stripped and acidified to dissolve the stabilizer. Spherical beads of polymer are formed, having the following sieve analysis (percent w./w. retained):

| Aperture (ins.) | 0.017 | 0.010 | 0.007 | 0.006 | 0.004 | <0.004 |
|---|---|---|---|---|---|---|
| Percent w./w. retained | 2.5 | 33.6 | 29.3 | 28.8 | 5.8 | trace |

*Example 6*

Ethyl acrylate, containing 0.1% w./v. benzoyl peroxide catalyst is polymerized at 60° C. in 5 times its volume of aqueous magnesium hydroxide suspension, containing 0.1% w./v. magnesium calculated as oxide (prepared as in Example 5). Soft beads, approximately 1 mm. in diameter, are obtained.

*Example 7*

Methyl methacrylate, containing 0.2% benzoyl peroxide catalyst is polymerized at 80° C. in 5 times its volume of aqueous magnesium hydroxide suspension, containing 0.2% w./v. magnesium calculated as oxide (prepared as in Example 5). Small spherical beads of polymethyl methacrylate are obtained.

*Example 8*

A monomer mixture containing 135 ml. styrene, 15 ml. acrylonitrile and 0.45 g. benzoyl peroxide is dispersed in 300 ml. of aqueous magnesium hydroxide suspension, containing 0.1% w./v. magnesium calculated as oxide (prepared as in Example 5), and polymerized at 70° C. The product is steam-stripped and acidified. Spherical polymer beads, having the following diameters, are formed:

| Aperture (ins.) | 0.062 | 0.029 | 0.017 | 0.010 | 0.007 | <0.007 |
|---|---|---|---|---|---|---|
| Percent w./w. retained | 36.6 | 37.2 | 4.7 | 7.7 | 6.6 | 7.2 |

Other physical properties of the copolymer are as follows:

Impact strength (compression moulded)
  $= 3.25 \times 10^6$ ergs/cm.$^2$
Volatile content (by freeze-dry) = 2.67%
Second order transition temp. $(T_m) = 85°$ C.
Acrylonitrile content = 8% w./w.

*Example 9*

A monomer mixture containing 116 ml. styrene, 34 ml. of a divinyl benzene-ethyl vinyl benzene mixture (140% unsaturation) and 0.2 gram benzoyl peroxide catalyst is dispersed in 300 ml. of aqueous magnesium hydroxide suspension, containing 0.1% w./v. magnesium calculated as oxide (prepared as in Example 5), and polymerized at 80° C. Beads of the following sizes are formed:

| Aperture (ins.) | 0.017 | 0.010 | 0.007 | 0.006 | <0.006 |
|---|---|---|---|---|---|
| Percent w./w. retained | 5.2 | 26.3 | 60.9 | 7.6 | trace |

The copolymer is insoluble in benzene.

*Example 10*

(a) *15% butadiene in monomers.*—142 grams sodium hydroxide, dissolved in ½ gallon water, is added to 417 grams magnesium sulphate dissolved in 9½ gallons of water. 1 ml. Teepol is added, followed by 14½ lbs. styrene containing 31 grams benzoyl peroxide. Air is removed from the system by flushing with nitrogen and distillation of a small portion of the charge, then 2½ lbs. butadiene are distilled in. The charge is polymerized at 90° C. and the product is steam-stripped to remove unreacted monomer. Small copolymer beads are produced having the following sieve analysis:

| Aperture (ins.) | 0.010 | 0.007 | 0.006 | 0.004 | <0.004 |
|---|---|---|---|---|---|
| Percent w./w. retained | 22.9 | 28.7 | 16.1 | 17.8 | 14.5 |

(b) *30% butadiene in monomers.*—The aqueous phase is prepared as in 10(a). The monomer mixture contains 11¼ lbs. styrene, 4.8 lbs. butadiene and 58.1 grams benzoyl peroxide. Polymerization is carried out at 90° C. and the product is steam-stripped at 100° C. Small rubbery polymer beads of irregular shape are obtained.

*Example 11*

A mixture of 55 parts by weight of vinylidene chloride, 45 parts acrylonitrile and 1 part benzoyl peroxide is dispersed in 250 parts of a magnesium hydroxide suspension (0.1% MgO) containing a 5% molar excess of caustic soda and polymerized for 4 hours at 70° C. Fine yellow beads of the copolymer are produced in 89.5% yield.

We claim:

1. A process for the suspension polymerization of a polymerizable ethylenic monomer which comprises polymerizing the monomer in an aqueous suspension containing excess alkali in the presence of finely divided magnesium hydroxide as sole suspension stabilizer, the excess alkali being a 1% to 10% molar excess relative to the moles of magnesium hydroxide present, whereby residual stabilizer particles may be removed from the finished polymer suspension by washing with aqueous acid.

2. A process as claimed in claim 1, wherein the polymerization is carried out at a temperature in the range 60 to 160° C.

3. A process as claimed in claim 1, wherein the concentration of the magnesium hydroxide lies within the range 0.1 to 1% by weight in grams of the volume of the polymerizable ethylenic monomer in milliliters.

4. A process as claimed in claim 1, wherein the aqueous suspension contains a small quantity of a surface active agent.

5. A process as claimed in claim 1, wherein the polymerizable ethylenic monomer is a vinyl aromatic compound.

6. A process as claimed in claim 5, wherein the vinyl aromatic compound is styrene.

7. A process as claimed in claim 5, wherein the monomer/water ratio lies in the range 1:1 to 1:2.

References Cited in the file of this patent

UNITED STATES PATENTS

| 2,524,627 | Hohenstein | Oct. 3, 1950 |
| 2,687,408 | Grim | Aug. 24, 1954 |